US010095660B2

(12) United States Patent
Macaro et al.

(10) Patent No.: US 10,095,660 B2
(45) Date of Patent: Oct. 9, 2018

(54) TECHNIQUES FOR PRODUCING STATISTICALLY CORRECT AND EFFICIENT COMBINATIONS OF MULTIPLE SIMULATED POSTERIOR SAMPLES

(71) Applicant: SAS Institute Inc., Cary, NC (US)

(72) Inventors: Christian Macaro, Raleigh, NC (US); Jan Chvosta, Raleigh, NC (US); Mark Roland Little, Cary, NC (US)

(73) Assignee: SAS Institute Inc., Cary, NC (US)

( * ) Notice: Subject to any disclaimer, the term of this patent is extended or adjusted under 35 U.S.C. 154(b) by 468 days.

(21) Appl. No.: 14/210,361

(22) Filed: Mar. 13, 2014

(65) Prior Publication Data

US 2014/0279816 A1 Sep. 18, 2014

Related U.S. Application Data

(60) Provisional application No. 61/779,136, filed on Mar. 13, 2013, provisional application No. 61/779,184, filed on Mar. 13, 2013.

(51) Int. Cl.
*G06N 7/02* (2006.01)
*G06N 7/06* (2006.01)
*G06F 17/18* (2006.01)
*G06N 7/00* (2006.01)

(52) U.S. Cl.
CPC ............ *G06F 17/18* (2013.01); *G06N 7/005* (2013.01)

(58) Field of Classification Search
CPC .......... G06N 5/048; G06N 7/005; G06N 7/04; G06N 99/005; G06N 5/04

USPC ......................................................... 706/52
See application file for complete search history.

(56) References Cited

U.S. PATENT DOCUMENTS

| 7,072,811 B2 | 7/2006 | Kadane et al. |
| 7,409,325 B2 | 8/2008 | Morara |
| 2014/0019059 A1* | 1/2014 | Shankle ............... G06F 19/345 702/19 |
| 2014/0095616 A1 | 4/2014 | White et al. |

OTHER PUBLICATIONS

Kristoffer Sahlin, "Estimating convergence of Markov chain Monte Carlo simulations", Master Thesis in mahematical Statistics, published by Mathematics and Statistics Department, Stockholms Univerisity, Stockholm, Sweden, Feb. 2011, pp. 1-36.*

(Continued)

*Primary Examiner* — Kakali Chaki
*Assistant Examiner* — Viker A Lamardo

(57) ABSTRACT

Various embodiments are generally directed to techniques for producing statistically correct and efficient combinations of multiple simulated posterior samples from MCMC and related Bayesian sampling schemes are described. One or more chains from a Bayesian posterior distribution of values may be generated. It may be determine whether the one or more chains have reached stationarity through parallel processing on a plurality of processing nodes. Based upon the determination, each of the one or more chains that have reached stationarity through parallel processing on the plurality of processing nodes may be sorted. The one or more sorted chains may be resampled through parallel processing on the plurality of processing nodes. The one or more resampled chains may be combined. Other embodiments are described and claimed.

32 Claims, 12 Drawing Sheets

(56) References Cited

OTHER PUBLICATIONS

William A. Link and Mitchell J. Eaton, "On Thinning of Chains in MCMC", Methods in Ecology and Evolution, vol. 3, 2012, pp. 112-115.*

Ioana A. Cosma and Masoud Asgharian, "Principle of Detailed Balance and Convergence Assessment of Markov Chain Monte Carlo methods and Simulated Annealing", arXiv preprint arXiv:0807. 2008, pp. 1-29.*

Anthony Lee, Christopher Yau, Michael B. Giles, Arnaud Doucet, Christorpher C. Holmes, "On the Utility of Graphics Cards to Perform Massively Parallel Simulation of Advanced Monte Carlo Methods", J Comput Graph Stat., vol. 19, No. 4, Dec. 1, 2010, pp. 769-789.*

Hedibert F. Lopes and Ruey S. Tsay, "Particle Filters and Bayesian Inference in Financial Economics", Journal of Forecasting, vol. 30, 2011, pp. 168-209.*

"Simulation of dependent random variables using copulas", The MathWorks, <http://www.mathworks.com/products/demos/statistics/copulademo.html>, 13 pages, Unknown date, Unknown author.

"Distributions, Simulation, and Excel Functions", <http://www.sba.oakland.edu/faculty/isken/hcm540/Session03_DMUncertainty/DistributionsSimulationExcelFunctions.pdf>, 4 pages, Jun. 11, 2013, unknown author.

Wikipedia, "Monte Carlo Method", <http://en.wikipedia.org/wiki/Monte_Carlo_method>, 10 pages, date unknown, author unknown.

"Data Analysis & Simulation", MathWave Technologies, <http://mathwave.com/blog/category/distributions/>, Dec. 2, 2013, 6 pages.

Man, Nguyen, V.M., "Mathematical Modeling and Simulation", Sep. 6, 2010, 70 pages (pp. 1-35).

Man, Nguyen, V.M., "Mathematical Modeling and Simulation", Sep. 6, 2010, 70 pages (pp. 36-70).

"Simulation Tutorial—Models", 2014 Frontline Systems, Inc., <http://www.solver.com/simulation-models>, 2 pages, (Author unknown).

"The mathematics of safe machine intelligence", Machine Intelligence Research Institute, <http://intelligence.org/research/?gclid=CMG1kJGzpb4CFUuX0godKj4ABw>, 4 pages, (unknown date, unknown author).

Reber et al., "Statistics Applets", <http://www.bbn-school.org/us/math/ap_stats/applets/applets.html>, May 2000, 4 pages.

Ing et al., "Mathematical and Computational Modeling and Simulation", < http://www.informatik.uni-hamburg.de/TIS/downloads/Vorlesung_CMS_2005_3.pdf>, 2005, 285 pages (pp. 1-45).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 46-86 ).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 87-135).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 136-192).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 193-240).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 241-285).

Raftery et al., "One Long Run with Diagnostics: Implementation Strategies for Markov Chain Monte Carlo", Statistical Science, (1992), 5 pages.

Raftery et al., "The Number of Iterations, Convergence Diagnostics, and Generic Metropolis Algorithms", Chapman & Hall, (1995), 15 pages.

Heidelberger et al., "Simulation Run Length Control in the Presence of an Initial Transient", Operations Research, vol. 31, No. 6, pp. 1109-1144, 1983.

Heidelberger et al., "A Spectral Method for Confidence Interval Generation and Run Length Control in Simulations", Simulation Modeling and Statistical Computing, Communications of the ACM, vol. 24, No. 4, Apr. 1981, 13 pages.

G Weke, J. (1992), "Evaluating the Accuracy of Sampling-Based Approaches to Calculating Posterior Moments," Oxford University Press, vol. 4, 1992, 25 pages.

Venables, W. N., "An Introduction to R", <http://crans-project.org/doc/manuals/r-release/R-intro.html>, version 3.1.1 (Jul. 10, 2014), 1990 pp. 1-45.

Venables, W. N., "An Introduction to R", <http://crans-project.org/doc/manuals/r-release/R-intro.html>, version 3.1.1 (Jul. 10, 2014), 1990 pp. 46-90.

Venables, W. N., "An Introduction to R", <http://crans-project.org/doc/manuals/r-release/R-intro.html>, version 3.1.1 (Jul. 10, 2014), 1990 pp. 91-124.

Office Action received for U.S. Appl. No. 14/210,259, dated Sep. 28, 2016, 18 pages.

Smith, Brian, "BOA: An R Package for MCMC Output Convergence Assessment and Posterior Inference", Journal of Statistical Software, vol. 21, iss. 25, (2007).

Office Action received for U.S. Appl. No. 14/210,259, dated Apr. 20, 2017, 23 pages.

Mnih, Andriy, "C5C2535 Appendix to Lecture 4: Introduction to Markov Chain Monte Carlo", (2006) <http://www.cs.toronto.edu/~hinton/csc2535_06/notes/lec4b.pdf>.

Office Action rece3ived for U.S. Appl. No. 14/210,259, dated Nov. 15, 2017, 27 pages.

Raferty et al., "How Many Iterations in the Gibbs Sampler?", Bayesian Statistics, vol. 4, Chapter, (1992), 14 pages.

\* cited by examiner

300

Generate one or more chains from a posterior distribution.
302

Determine whether the one or more chains have reached convergence.
304

Sort one or more chains that have reached convergence.
306

Resample the one or more sorted chains.
308

Combine the one or more resampled chains.
310

BIAS Study on Multiple Modes: Proposed Aggregation

| | p1 | p5 | p10 | p25 | p50 | p75 | p90 | p95 | p99 | mean | std |
|---|---|---|---|---|---|---|---|---|---|---|---|
| m | 0.5269337 | 1.1208723 | 2.710614 | 3.8371981 | 9.9668658 | 7.8430628 | 1.5873743 | 2.7516043 | 0.0015061 | 0.8107087 | 0.1462458 |
| b | 0.0014118 | 1.0926755 | 2.8199180 | 8.325812 | 8.0683386 | 3.8627983 | 4.4019768 | 0.0040708 | 0.0017618 | 0.6882404 | 0.1320041 |

BIAS Study on Multiple Modes: Simple Aggregation

| | p1 | p5 | p10 | p25 | p50 | p75 | p90 | p95 | p99 | mean | std |
|---|---|---|---|---|---|---|---|---|---|---|---|
| m | 0.7457876 | 6.0463182 | 14.50722 | 49.168036 | 39.226392 | 42.944084 | 16.583613 | 7.7797089 | 0.0282648 | 17.277218 | 2.4131414 |
| b | 1.3376287 | 5.9748003 | 12.369114 | 39.808119 | 28.303013 | 36.880115 | 11.597493 | 6.0074949 | 1.3906502 | 12.521307 | 2.1439724 |

BIAS Study on Multiple Modes: Single Chain

| | p1 | p5 | p10 | p25 | p50 | p75 | p90 | p95 | p99 | mean | std |
|---|---|---|---|---|---|---|---|---|---|---|---|
| m | 169.97949 | 163.87089 | 157.52936 | 132.69433 | 104.98351 | 115.17412 | 139.00072 | 147.21445 | 160.28287 | 83.105555 | 44.114226 |
| b | 172.1603 | 161.61383 | 152.0305 | 131.71845 | 93.914803 | 121.49127 | 153.9073 | 158.01911 | 163.3517 | 78.132755 | 47.26622 |

BIAS STUDY ON MULTIPLE MODES: PROPOSED AGGREGATION

|   | p1 | p5 | p10 | p25 | p50 | p75 | p90 | p95 | p99 | mean | std |
|---|---|---|---|---|---|---|---|---|---|---|---|
| m | 0.0063451 | 0.0026208 | 0.0003602 | 0.0002007 | 0.0005975 | 0.0000413 | 0.00035 | 0.0015131 | 0.0011447 | 6.9945E-6 | 0.000185 |
| b | 0.0000129 | 0.0001461 | 0.0009654 | 0.0006635 | 0.0008116 | 0.0003039 | 0.0001321 | 0.0000104 | 0.0007514 | 0.0004498 | 8.4653E-6 |

BIAS STUDY ON MULTIPLE MODES: SIMPLE AGGREGATION

|   | p1 | p5 | p10 | p25 | p50 | p75 | p90 | p95 | p99 | mean | std |
|---|---|---|---|---|---|---|---|---|---|---|---|
| m | 0.0064811 | 0.0045373 | 0.000679 | 0.0003285 | 0.0006472 | 0.0001399 | 0.0003919 | 0.0015526 | 0.0011466 | 0.0000174 | 0.0003225 |
| b | 0.0000129 | 0.000281 | 0.0011291 | 0.0011307 | 0.0008311 | 0.000138 | 0.0001761 | 0.0000439 | 0.0006148 | 0.0004918 | 0.0000584 |

BIAS STUDY ON MULTIPLE MODES: SINGLE CHAIN

|   | p1 | p5 | p10 | p25 | p50 | p75 | p90 | p95 | p99 | mean | std |
|---|---|---|---|---|---|---|---|---|---|---|---|
| m | 0.0000901 | 0.00004 | 0.0000119 | 0.0000186 | 0.0000181 | 0.0000408 | 0.0001483 | 0.0000671 | 0.0014348 | 0.0000248 | 0.0000256 |
| b | 0.0000191 | 7.3619E-6 | 5.8286E-6 | 5.7781E-6 | 0.0000185 | 5.8007E-6 | 0.0000194 | 0.0000131 | 0.0000516 | 3.8124E-6 | 8.4315E-7 |

*FIG. 8*

TECHNIQUES FOR PRODUCING STATISTICALLY CORRECT AND EFFICIENT COMBINATIONS OF MULTIPLE SIMULATED POSTERIOR SAMPLES

RELATED APPLICATION

This application claims the benefit of priority under 35 U.S.C. § 119(e) to U.S. Provisional Application No. 61/779,136, filed Mar. 13, 2013, which is hereby incorporated by reference in its entirety and this application claims the benefit of priority under 35 U.S.C. § 119(e) to U.S. Provisional Application No. 61/779,184, filed Mar. 13, 2013, which is hereby incorporated by reference in its entirety.

This instant application is related to commonly owned United States Patent Application filed today, titled "TECHNIQUES FOR AUTOMATED BAYESIAN POSTERIOR SAMPLING USING MARKOV CHAIN MONTE CARLO AND RELATED SCHEME" as U.S. Ser. No. 14/210,259, which is incorporated by reference in its entirety and related to commonly owned United States Patent Application filed today, titled "TECHNIQUES FOR AUTOMATED BAYESIAN POSTERIOR SAMPLING USING MARKOV CHAIN MONTE CARLO AND RELATED SCHEME" as U.S. Ser. No. 14/210,301, which is incorporated by reference in its entirety.

BACKGROUND

The importance of Bayesian analysis has grown over the years due to development of Markov Chain Monte Carlo (MCMC) simulation methods as well as the availability of affordable computing power. Bayesian analysis is mainly focused on the analysis of the so-called "posterior distribution," and MCMC simulation methods are able to produce approximate samples from this distribution.

SUMMARY

The following presents a simplified summary in order to provide a basic understanding of some novel embodiments described herein. This summary is not an extensive overview, and it is not intended to identify critical elements or to delineate the scope thereof. Its sole purpose is to present some concepts in a simplified form as a prelude to the more detailed description that is presented later.

Various embodiments are generally directed to techniques for producing statistically correct and efficient combinations of multiple simulated posterior samples from MCMC and related Bayesian sampling schemes. Bayesian analysis hinges on the posterior distribution and MCMC simulation methods may be used to produce approximate samples from this distribution. The approximation may improve with the size of a sample, however, as sample sizes grow, the generation of a large approximating sample may become difficult using traditional methods. Embodiments described herein may utilize one or more processing units to generate a plurality of simulated posterior samples, which may be sorted, resampled, and combined into a single large sample. In this manner, the benefits of a large approximate sample may be obtained.

In various embodiments, one or more chains from a Bayesian posterior distribution of values may be generated. It may be determine whether the one or more chains have reached stationarity through parallel processing on a plurality of processing nodes. Each of the one or more chains that have reached stationarity through parallel processing on the plurality of processing nodes may be sorted. The one or more sorted chains may be resampled through parallel processing on the plurality of processing nodes. The one or more resampled chains may be combined. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates an example of a logic flow for producing posterior samples from MCMC and related Bayesian sampling schemes.

FIG. 5 illustrates an example of a table representing results of an exemplary embodiment.

FIG. 8 illustrates an example of a table representing results of an exemplary embodiment.

DETAILED DESCRIPTION

Figure 1:
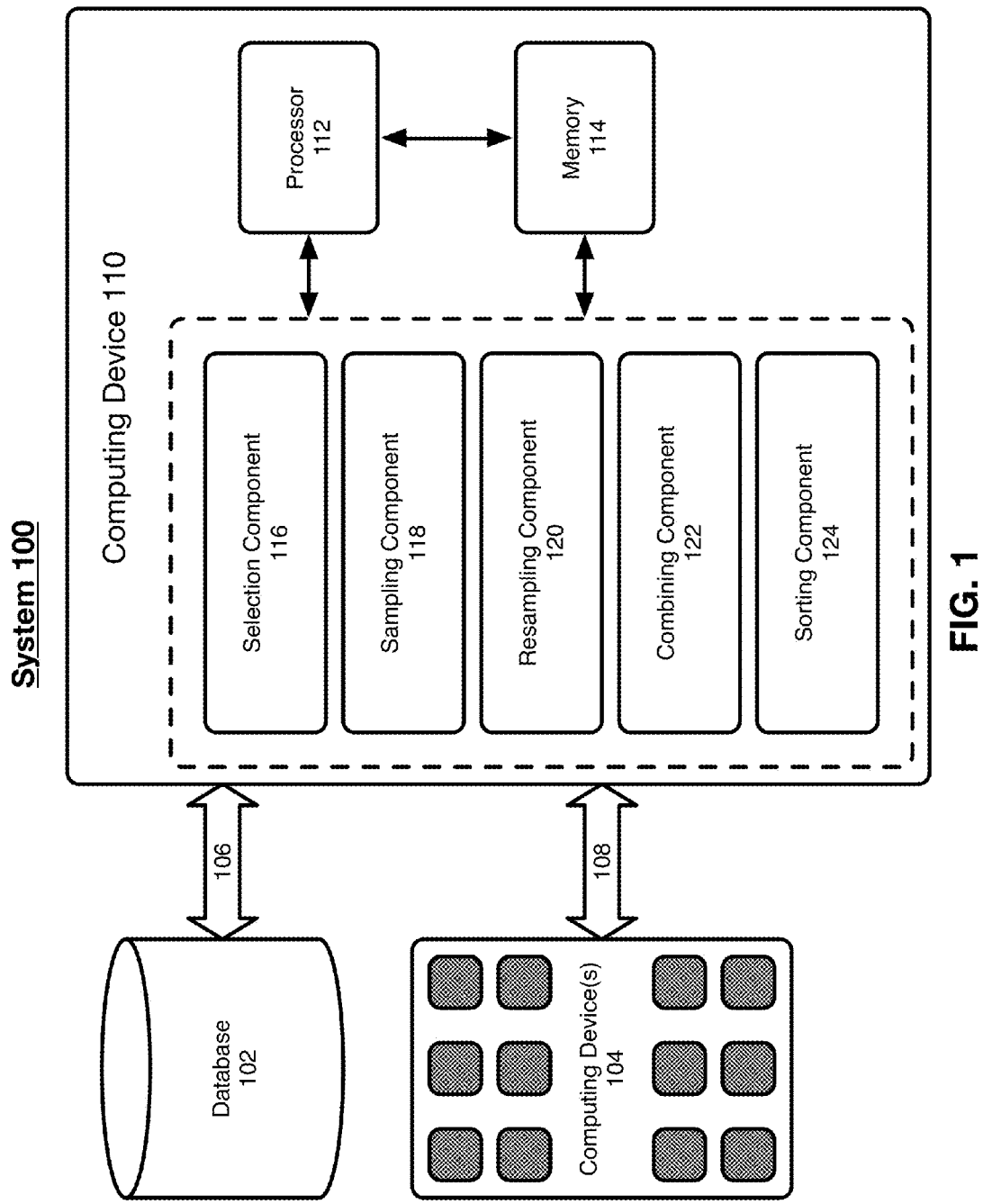
FIG. 1 illustrates an example of a system for producing posterior samples from MCMC and related Bayesian sampling schemes.

Various embodiments are generally directed to techniques for producing statistically correct and efficient combinations of multiple simulated posterior samples from MCMC and related Bayesian sampling schemes. Bayesian analysis hinges on the analysis of the posterior distribution and MCMC simulation methods may be used to produce approximate samples from the posterior distribution. The approximation may improve with the size of a sample, however, as sample sizes grow, the generation of a large approximating sample may become unfeasible using traditional processing systems and methods. In general, and as used herein, the notation for the problem of Bayesian modeling is as follows. A likelihood function defined by the statistical model being analyzed may be represented by $L(X,Y)$, where the vector of parameters of the model is X and Y is the given input data to which the model is being fit. A prior distribution of a parameters is represented by $\Pi_0(X)$, and the posterior distribution of the parameters is represented by $\Pi(X) = C \cdot L(X,Y) \cdot \Pi_0(X)$, where the constant C is unknown.

Embodiments described herein may utilize one or more processing units, or one or more threads within a single processing unit, to generate a plurality of simulated posterior samples, which may be sorted, resampled, and combined into a single large sample. In this manner, the benefits of a large approximate sample may be obtained.

In some embodiments, the utilization of parallel computing may shorten the time required to generate an approximating sample of a posterior distribution, in particular, an approximate sample of a large size. Embodiments described herein may run multiple MCMC algorithms in parallel chains and, by combining the parallel chains, an approximate sample of a posterior distribution may be obtained, which may improve with the number of chains run. The corresponding degree of approximation may be determined, not only by the number of samples within each chain, but also by the number of chains that can be run in parallel.

An embodiment may utilize parallel computing to generate multiple chains, each of them potentially being able to represent only a portion of the entire posterior distribution (for example, this may occur when the posterior distribution is characterized by multiple modes, and the chain is trapped in the neighborhood of these modes). The multiple chains may be combined using a resampling algorithm with weights to fully represent the posterior distribution and provide unbiased results and inference. An accurate combination of multiple chains run may be run in parallel, regardless of whether each chain is able to represent only a portion of the entire posterior distribution. Further, additional chains may be generated prior to returning an approximate sample if the representation is not considered to be complete. In this manner, a Bayesian analysis may be performed on a large sample with increased speed and greater accuracy. Accuracy may be heightened because point estimates associated with the center of a distribution as well as the percentiles in the tails of the distribution may be considered.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to these communications as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example of a system designed to implement various techniques for producing statistically correct and efficient combinations of multiple simulated posterior samples from MCMC and related Bayesian sampling schemes. The system 100 may be implemented as part of a computing system or communications system, examples of which are described in more detail herein with reference to FIGS. 9-12. Although the system 100 as shown in FIG. 1 has a limited number of elements in a certain topology, it may be appreciated that the system 100 may include more or less elements in alternate topologies as desired for a given implementation.

In the illustrated embodiment shown in FIG. 1, the system 100 comprises multiple components, including database 102, computing devices 104, and computing device 110. Database 102 may be included within a server device or other computing device, or distributed among a plurality of computing devices, as described below. Computing devices 104 and computing device 110 may each be implemented as any electronic device having computing and/or communications capabilities. Examples of database 102, computing devices 104, and computing device 110 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, database 102, computing devices 104, and computing device 110 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor (such as processor 112), a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices of system 100, and components and/or modules within a device of system 100, may be communicatively coupled via various types of communications media as indicated by various lines or arrows, such as connections 106 and 108. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, database 102, computing devices 104, and computing device 110 of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In various embodiments, computing device 110 may operate as a central processing node or coordinating device to coordinate distributed processing operations implemented by computing devices 104. Computing devices 104 and computing device 110 may include one or more processors and one or more data subsets communicatively coupled to the processors, as described in more detail below with respect to FIG. 2. Data subsets, which may be stored within database 102, memory of computing devices 104, and/or memory 114, may include memory units, which may store various data blocks for retrieval and software programs, such as selection component 116, sampling component 118, resampling component 120, combining component 122, and sorting component 124, for example. In one embodiment, each of these components and/or modules may be software elements that, when executed by processors of computing devices 104 and/or computing device 110, perform a discrete set of operations.

Components of computing device 110 may be generally arranged to manage operations performed on one or more datasets of database 102 utilizing one or more of computing devices 104. In an embodiment, database 102 may include data representing a posterior distribution, in which one or more samples may be taken. Of course database 102 may include additional data, include one or more additional posterior samples, for example. A posterior distribution may include a distribution of multiple data items, data elements or samples within a given population (collectively referred to herein as "data items"). In one embodiment, the data items may each comprise an alphanumeric value. By way of example, an MCMC algorithm may be used to generate a series of approximate samples from the posterior distribution by sampling modules of computing devices 104 (not shown). For example, each of computing devices 104 may perform one or more MCMC algorithms that may be configured to generate approximate samples from a posterior distribution, as discussed herein with respect to FIG. 2. In an embodiment, sampling component 118 may be configured to utilize one or more of computing devices 104 to perform sampling operations on a posterior distribution, as discussed below.

As described herein, sampling may be allocated among multiple computing, or processing, nodes of system 100, such as computing devices 104, each including one or more processing nodes. Each processing node may be assigned one or more samples to process using MCMC simulation methods. A processing node may represent some discrete measure of computational resources. Examples of a processing node may include without limitation a processing thread, multiple processing threads, a processor, multiple processors, and so forth. One or more processing nodes may be implemented on a single device or multiple devices. For instance, when implemented by a single device such as computing device 110, a processing node may comprise a processing thread implemented on a single processor. In this case multiple processing nodes may be implemented as multiple processing threads on single processors, a single processing thread on each of multiple processors, multiple processing threads on multiple processors, or some combination thereof. In another example, when implemented by multiple devices such as computing devices 104, a processing node may comprise an entire computing device having one or more processors. In this case, multiple processing nodes may be implemented as two or more computing devices, such as computing devices 104. It may be appreciated that multiple processing nodes may be implemented in any combination of single computing devices and multiple computing devices, each having one or more processors capable of executing one or more processing threads, as desired for a given implementation. The embodiments are not limited in this context.

In various embodiments, multiple processing nodes, as implemented by computing devices 104, may be arranged to process multiple data samples of a posterior distribution in a parallel or sequential manner. For example, computing devices 104 may each perform a discrete set of operations for respective data samples. In an embodiment, computing device may include selection component 116, which may be configured to select one or more starting points, or initial values, for Bayesian posterior sampling. The starting points for these posterior samples may be generated randomly from an initializing probability distribution formed as either: a)

the prior distribution for the Bayesian analysis; b) a version of the prior distribution with re-scaled variance; c) a multivariate normal distribution constructed to approximate the sampling distribution of the maximum likelihood estimator for the problem; d) some other distribution; or e) a probability distribution that mixes the distributions of cases a-d.

In an embodiment, selection component 116 may be configured to repeatedly select k multivariate-samples from the posterior distribution, which may be stored in database 102 and/or memory 114. The values for k may be manually input by a user, or may be determined by processor 112 automatically based upon a variety of criteria, such as a desired accuracy, available processing power, number of available parallel processing units, or a desired runtime, for example. Further, the values for k may be randomly selected by a processor in some embodiments. In an embodiment, the k chains may be of length n, or the k chains could be of different lengths, with a separate value of n for each chain. The use of n should be understood as illustrative, and in some examples, each chain may have a different value for n.

In an embodiment, sampling component 118 may be configured to generate samples using one or more processors or processor threads. For example, processor 112 may include multiple cores, each responsible for sampling operations. In another example, computing devices 104, which may include sampling components, may be utilized by sampling component 118 to generate multiple samples from a posterior distribution. An MCMC algorithm may be used to generate n samples from the posterior distribution, which may be stored in database 102 and/or memory 114. Therefore, several instances of the MCMC algorithm will produce several sets, or chains, of posterior samples. The total number of samples ($n_i$) from each chain (i) may be able to approximate only a portion, or region, of the posterior distribution (locally) or they may be able to approximate the entire posterior distribution (globally). Each chain may be characterized by different lengths ($n_1$, . . . , $n_k$). The computing device 110 may be configured to normalize the ($n_1$, . . . , $n_k$) into (n, . . . , n). For example, each of the shorter chains could be sub-sampled until the size matches the longest chain. Expression 1 depicts k chains of samples from the posterior distribution after their lengths have been normalized to n. As shown in Expression 1, the subscripts 'n' in the terms xn1, xn2, . . . xnk, may represent different values, as the length of the ith of the k chains may be different than that of the jth.

$$\begin{pmatrix} x_{11} \\ x_{21} \\ \vdots \\ x_{n1} \end{pmatrix} \begin{pmatrix} x_{12} \\ x_{22} \\ \vdots \\ x_{n2} \end{pmatrix} \ldots \begin{pmatrix} x_{1k} \\ x_{2k} \\ \vdots \\ x_{nk} \end{pmatrix} \quad \text{Expression 1}$$

For each sample in each chain, an un-normalized posterior density $\pi$ proportional to the normalized posterior density $\Pi$ is available (see Equation 2), where $\Pi()$ is a posterior distribution and X in $\Pi(X)$ is a value of the parameter vector:

$$\pi(x_{ij}) \propto \Pi(X=x_{ij}) \; \forall i,j \quad \text{Equation 2}$$

In various embodiments, the symbols $x_{ij}$ may be sampled parameter vectors. Each $x_{ij}$ value may be a vector, which may contain many numbers, one number for parameter of the model, and in the case of large and complex problems, there may be hundreds or thousands of parameters. Thus, each vector $x_{ij}$ may represent a substantial amount of data in computer memory or disk, and represent substantial computation to sample. Each of the k chains may be modified to: a) discard some values from the start of the chain ("burn in"), b) to adjust the length of the chain to satisfy various tests of stationarity, or c) other modifications of the sampling process common in Bayesian posterior sampling practice. Examples of commonly used tests for stationarity of sampling chains include the Geweke test and the Heidelberger-Welch tests, for example. The Geweke test may be used to check stationarity by comparing local means. The Heidelberger-Welch test may be used to determine covariance stationarity and to indicate a proxy of a burn-in. The Heidelberger-Welch half test may be used to check if the mean is accurate.

In various embodiments, when the k chains become stationary, simple aggregation, such a stacking the chains together, may not be desirable. Instead, in an exemplary embodiment, the k chains may be sorted and resampled using sorting component 124 and resampling component 120, respectively. Prior to resampling, sorting component 124 may be configured to sort each chain. Prior to resampling, sorting component 124 may sort each chain in order of the value of the un-normalized probability density $\pi(x_{ij})$ (defined in Equation 2) associated with each sampled point $x_{ij}$, as shown in Expression 3. Resampling component 120 may be configured to resample the k chains according to Expression 3 below. Further, in some embodiments, sorting and resampling for each chain may take place in parallel, utilizing parallel processing devices, such as computing devices 104. In various embodiments, the sorting of the chains may be accomplished by sorting indexes into the sampled chain without any actual data movement of the sampled $x_{ij}$, and, likewise, the resampling of each chain may be accomplished by resampling the set of indexes, without any movement or copying of the $x_{ij}$. Further, the resampled chains may remain on the computational nodes where they were created. The general sorting-resampling scheme can be summarized as follows:

$$\begin{pmatrix} x_{11} \\ x_{21} \\ \vdots \\ x_{n1} \end{pmatrix} \begin{pmatrix} x_{12} \\ x_{22} \\ \vdots \\ x_{n2} \end{pmatrix} \ldots \begin{pmatrix} x_{1k} \\ x_{2k} \\ \vdots \\ x_{nk} \end{pmatrix} \Rightarrow \quad \text{Expression 3}$$

$$\begin{pmatrix} x_{[1]1} \\ x_{[2]1} \\ \vdots \\ x_{[n]1} \end{pmatrix} \begin{pmatrix} x_{[1]2} \\ x_{[2]2} \\ \vdots \\ x_{[n]2} \end{pmatrix} \ldots \begin{pmatrix} x_{[1]k} \\ x_{[2]k} \\ \vdots \\ x_{[n]k} \end{pmatrix} \Rightarrow \begin{pmatrix} \tilde{x}_1 \\ \tilde{x}_2 \\ \vdots \\ \tilde{x}_k \\ \tilde{x}_{k+1} \\ \tilde{x}_{k+2} \\ \vdots \\ \tilde{x}_{2k} \\ \vdots \\ \tilde{x}_{(n-1)k+1} \\ \tilde{x}_{(n-1)k+2} \\ \vdots \\ \tilde{x}_{nk} \end{pmatrix}$$

where $(x_{[1]k} \; x_{[2]k} \; \ldots \; x_{[n]k})'$ represents chain k after being sorted and $\tilde{x}_{i+1}, \tilde{x}_{i+2}, \ldots, \tilde{x}_{i+k}$ are samples obtained through resampling with replacement of $(x_{[1]k}\ x_{[2]k}\ \ldots\ x_{[n]k})'$ and resampling weights proportional to the un-normalized posterior densities $\pi(x_{[i]j})$:

As set forth above, in the sorting component 124, each column (samples from a single chain) may be sorted with respect to the un-normalized posterior densities $\pi(x_{[i]j})$, as follows:

$$\begin{pmatrix} x_{11} \\ x_{21} \\ \ldots \\ x_{n1} \end{pmatrix} \begin{pmatrix} x_{12} \\ x_{22} \\ \ldots \\ x_{n2} \end{pmatrix} \ldots \begin{pmatrix} x_{1k} \\ x_{2k} \\ \ldots \\ x_{nk} \end{pmatrix} \Rightarrow \begin{pmatrix} x_{[1]1} \\ x_{[2]1} \\ \ldots \\ x_{[n]1} \end{pmatrix} \begin{pmatrix} x_{[1]2} \\ x_{[2]2} \\ \ldots \\ x_{[n]2} \end{pmatrix} \ldots \begin{pmatrix} x_{[1]k} \\ x_{[2]k} \\ \ldots \\ x_{[n]k} \end{pmatrix}$$

In the resampling component 120, each column (sorted samples from a single chain) may be resampled with weights proportional to the un-normalized posterior densities $\pi(x_{[i]j})$:

$$\begin{pmatrix} x_{[1]1} \\ x_{[2]1} \\ \ldots \\ x_{[n]1} \end{pmatrix} \begin{pmatrix} x_{[1]2} \\ x_{[2]2} \\ \ldots \\ x_{[n]2} \end{pmatrix} \ldots \begin{pmatrix} x_{[1]k} \\ x_{[2]k} \\ \ldots \\ x_{[n]k} \end{pmatrix} \Rightarrow \begin{pmatrix} \tilde{x}_1 \\ \tilde{x}_2 \\ \ldots \\ \tilde{x}_k \\ \tilde{x}_{k+1} \\ \tilde{x}_{k+2} \\ \ldots \\ \tilde{x}_{2k} \\ \vdots \\ \tilde{x}_{(n-1)k+1} \\ \tilde{x}_{(n-1)k+2} \\ \ldots \\ \tilde{x}_{nk} \end{pmatrix}$$

In an embodiment, combining component 122 may be configured to recombine one or more samples. In an example, combining component 122 may recombine samples from one or more of computing devices 104. Weights for each sample may be set to be proportional to the posterior distribution, as set forth in Expression 4, below.

$$\pi(x_{i1}), \pi(x_{i2}), \ldots, \pi(x_{ik})$$ Expression 4

In various embodiments, combining component 122 may be configured to combine multiple samples, which may have converged to local regions, based upon weights. For example, samples with higher weights may be combined, while samples that have converged to local regions, but with lower weights may be disregarded. Once combined, the combined samples may be output to a storage device, such as memory 114 or database 102, and, in some embodiments, displayed on a display device in a table, graph, or chart format.

As described above, each chain may be stored on a separate node, such as among computing devices 104. In this manner, efficiencies may be gained by analyzing different samples of a posterior distribution in parallel. Typically, the number of nodes involved will grow with the number of chains, which may make it difficult to copy all of the chains onto a single node during resampling. The following example sets forth a resampling procedure according to an embodiment utilizing a multi-node system. The resampling procedure may be performed on multiple nodes, each with several computing devices 110 as described with respect to FIG. 2. Assuming the following scenario, where $x_{[1],1,1}$ represents the first sorted observation of chain 1 on node 1.

$$\underbrace{\left[ \begin{pmatrix} x_{[1].1.1} \\ x_{[2].1.1} \\ \ldots \\ x_{[n].1.1} \end{pmatrix} \begin{pmatrix} x_{[1].1.1} \\ x_{[2].1.1} \\ \ldots \\ x_{[n].1.1} \end{pmatrix} \ldots \begin{pmatrix} x_{[1].k_1.1} \\ x_{[2].k_1.1} \\ \ldots \\ x_{[n].k_1.1} \end{pmatrix} \right]}_{\text{Node 1}} \ldots \underbrace{\left[ \begin{pmatrix} x_{[1].1.m} \\ x_{[2].1.m} \\ \ldots \\ x_{[n].1.m} \end{pmatrix} \begin{pmatrix} x_{[1].1.m} \\ x_{[2].1.m} \\ \ldots \\ x_{[n].1.m} \end{pmatrix} \ldots \begin{pmatrix} x_{[1].k_2.m} \\ x_{[2].k_2.m} \\ \ldots \\ x_{[n].k_2.m} \end{pmatrix} \right]}_{\text{Node } m}$$

As set forth within Equation 5, below, the sum of the un-normalized posterior densities for row i across the $k_1$ chains in node 1 may be defined as:

$$\Sigma_{[i],1} = \pi_{[i],1,1} + \pi_{[i],2,1} + \ldots + \pi_{[i],k,1}$$ Equation 5

The number of resamples $q_{[i],1}$ to be obtained from node 1 may be obtained with a multinomial resampling, as set forth in Equation 6, below.

$$q[1], 1 \cdot q[i], 2, \ldots, q[1i],$$ Equation 6

$$m \sim \text{Multinomial}\left(Q \left| \frac{\Sigma_{[i],1}}{\Sigma_{[i]}}, \frac{\Sigma_{[i],2}}{\Sigma_{[i]}}, \ldots, \frac{\Sigma_{[i],m}}{\Sigma_{[i]}} \right.\right)$$

where $$\Sigma_{[i]} = \Sigma_{[i],1} + \Sigma_{[i],2} + \ldots + \Sigma_{[i],m}$$

and Q is the total number of desired resamples for row i.

Once, the number of resamples that should be obtained from each node has been determined, each node may perform a second resampling step, according to Equation 7, below:

$$q[i], 1, j, q[i], 2, j, \ldots, q[i], k_1,$$ Equation 7

$$j \sim \text{Multinomial}\left(q_{[i],j} \left| \frac{\pi_{[i],1,j}}{\Sigma_{[i],j}}, \frac{\pi_{[i],2,j}}{\Sigma_{[i],j}}, \ldots, \frac{\pi_{[i],k_j,j}}{\Sigma_{[i],j}} \right.\right)$$

where $q_{[i],1,j}$ represents the number of resamples from row i of chain 1 from node 1.

According to Equation 7, $q_{[i],1,1}$ may represent how many resamples may be taken from the $i^{th}$ ordered sample of the first chain of a first node. Thus, in some embodiments, resampling may be performed by a plurality of nodes according to the procedure above. In this manner, resampling may be performed with reduced communication between nodes. In addition, once the number of resamples that should be obtained from each node has been determined, resampling may be structured into blocks.

Figure 2:
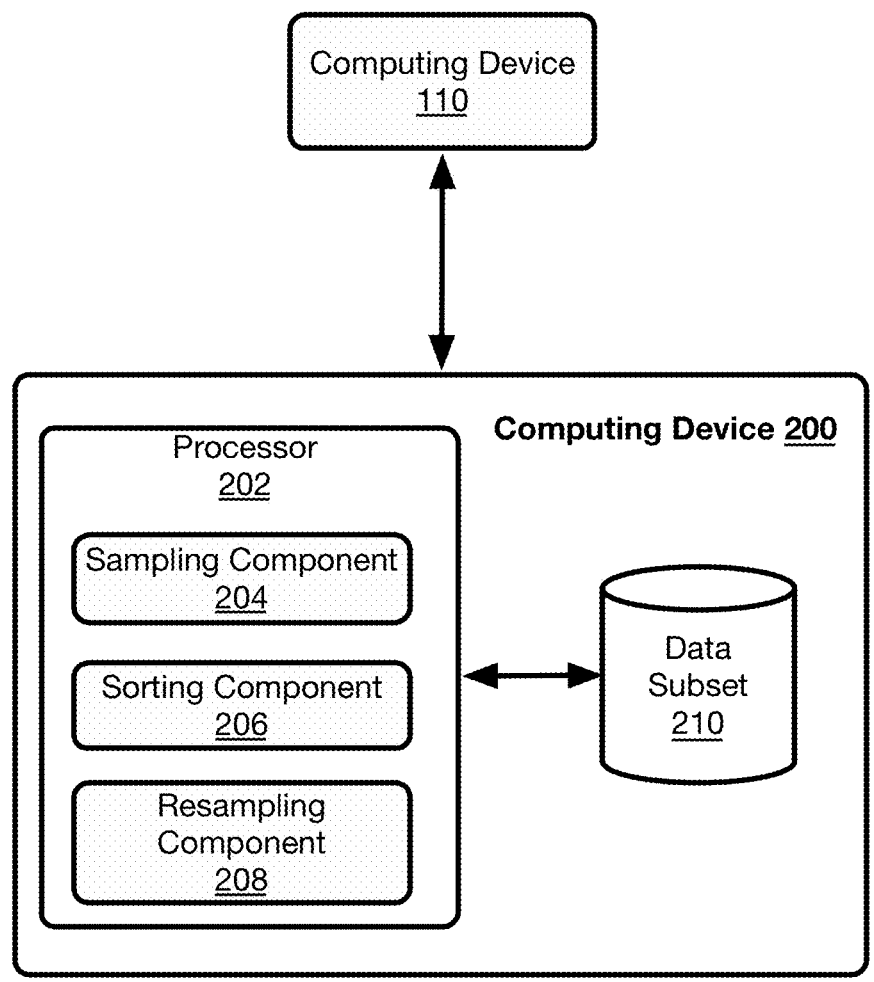
FIG. 2 illustrates an example of a system for producing posterior samples from MCMC and related Bayesian sampling schemes.

FIG. 2 illustrates an example of a system including computing device 200, which may communicate with computing device 110. In various embodiments, computing device 200 may be similar to, and representative of, one of computing devices 104, described above with respect to FIG. 1. For example, each of computing devices 104 of FIG. 1 may include one or more of the components illustrated with respect to computing device 200. Computing device 200 may include a communication link to another computing device, such as computing device 110. Through this communication link, instructions and data, such as one or more samples of a posterior distribution, may be communicated between computing device 200 and computing device 110.

In various embodiments, computing device 200 may include a data storage 210 storing a subset of data, such as a data sample. Processor 202 may also be included within computing device 200, and may include any of the processor components described herein. Further, computing device 200 may include a components that may be executed by processor 202, including sampling component 204, sorting component 206, and resampling component 208. These components may be similar to sampling component 118, sorting component 124, and resampling component 120, described above with respect to FIG. 1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

FIG. 3 illustrates an example of a logic flow. At 302, one or more chains from a posterior distribution are selected. A selection component, such as selection component 116, may be configured to select one or more starting points, or initial values, for Bayesian posterior sampling. The selection component may be configured to select k samples of length n from a globally stationary posterior distribution, which may be stored in a database and/or memory. The values for k and n may be manually input by a user, or may be determined by a processor based upon a variety of criteria, such as a desired accuracy, available processing power, number of available parallel processing units, size of a posterior distribution, or a desired runtime, for example. Further, the values for k and n may be randomly selected by a processor in some embodiments.

At 304, one or more processes may be run to determine whether one or more chains have reached stationarity. In an embodiment, MCMC algorithms may be used to determine whether one or more samples of a posterior distribution have reached stationarity. Stationarity may be determined using one ore more Bayesian techniques, such as the Geweke test or the Heidelberger-Welch test, for example. A sampling component may utilize techniques described herein with described above with respect to FIG. 1 and FIGS. 5-8, for example.

At 306, when one or more chains have reached stationarity, a sorting component may sort the one or more stationary chains to prepare for resampling. In an embodiment, a sorting component, such as sorting component 124 describe above with respect to FIG. 1, may sort the one or more chains according to the un-normalized posterior distribution.

At 308, the one or more sorted chains may be resampled by a resampling component according to one or more of the resampling techniques described herein with respect to FIG. 1 or FIGS. 5-8. In an example, a resampling component, such as resampling component 120 or resampling component 208 may resample one or more chains based upon a sorted weighted aggregation.

At 310, the one or more resampled chains may be combined by a combining component, such as combining component 122. In various embodiments, a combining component may process one or more resampled chains into a combined sample in accordance with the techniques described herein within respect to FIG. 1 and FIGS. 5-8. Once combined, the combined samples may be output to a storage device, such as memory 114 or database 102, and, in some embodiments, displayed on a display device in a table, graph, or chart format.

Figure 4:
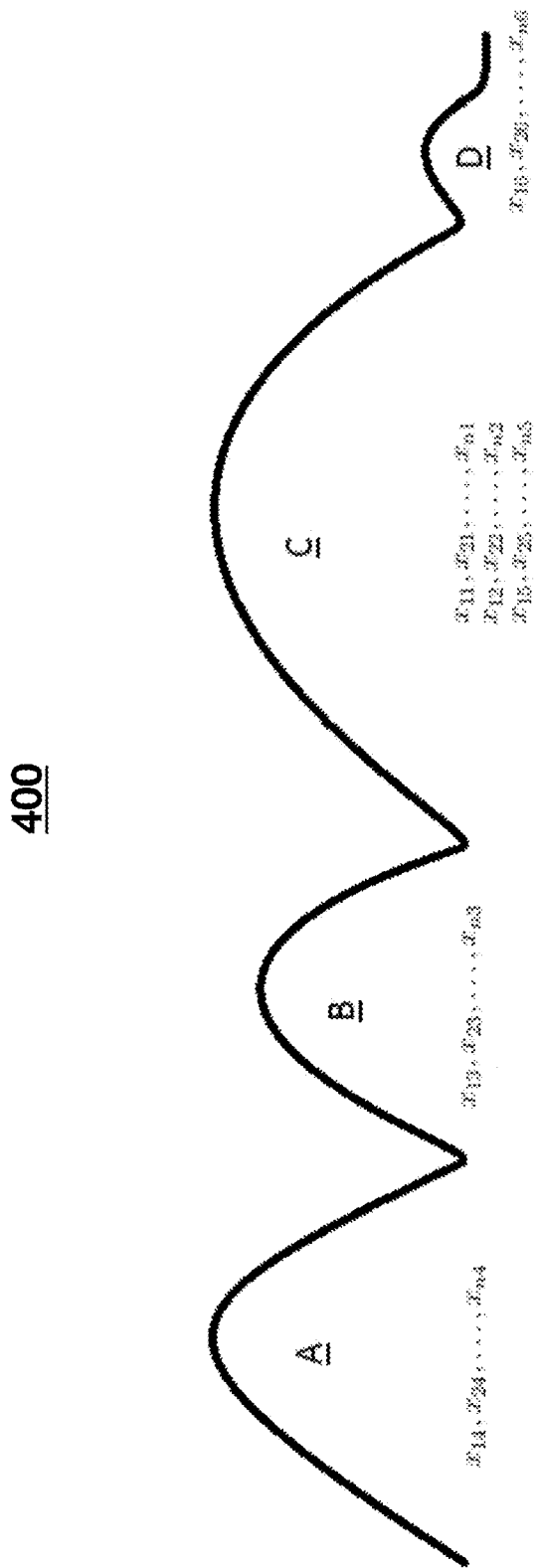
FIG. 4 illustrates an example of a graph representing multiple samples that have reached stationarity.

FIG. 4 illustrates an example of a graph illustrating multiple samples that have reached stationarity. In an embodiment, resampling and combining multiple samples may be performed in a manner that favors higher weights while disregarding samples with lower weights, or peaks. In some embodiments, one or more criteria or thresholds may be used to determine which modes to disregard during resampling and combining. For example, FIG. 4 illustrates six samples of n values each that got trapped in four different modes, A, B, C, and D. As shown, the lowest weighted mode is mode D. Thus, in an embodiment, it may be determined that mode D should be disregarded, and modes A, B, and C should be resampled and combined.

In various embodiments, as described above, it is important to note that a resampling may not be performed on unsorted chains. Resampling on unsorted chains that have reached different modes may over-emphasize the peaks over the tail of the distribution if the number of chains grows, for example. When the number of chains is large, the chance the one of the chain will be around the mode will be high, which may imply over sampling around the modes.

FIGS. 5-8 illustrate examples of a tables and graphs representing results of the following example. As discussed above, in an exemplary MCMC analysis, a study of a posterior distribution may be performed with multiple chains, which may be evaluated on multiple nodes in parallel. In some cases, if all chains converge to the same distribution, the chains may be aggregated together using simple aggregation. However, if the chains do not converge to the same distribution, simple aggregation may not be effective. An alternative to simple aggregation may be the method proposed above with respect to FIG. 1, which may recognize that chains may converge to different portions of the same posterior distribution. When chains converge to different portions of the same posterior distribution, a sorted weighted aggregation with resampling may be performed.

In an exemplary embodiment, a linear regression model with known error variance may be used, as set forth in Equation 8, below. By way of example and not limitation, there may be two observations available, which minimizes the likelihood of contribution to the posterior for purposes of illustration:

$$y = X\beta + \varepsilon \quad \text{Equation 8}$$

where $$y = \begin{bmatrix} y_1 \\ y_2 \end{bmatrix}$$

$$x = \begin{bmatrix} 1 & z_1 \\ 1 & z_2 \end{bmatrix}$$

$$\beta = \begin{bmatrix} m \\ b \end{bmatrix}$$

$$\varepsilon \sim N(0, 15^2)$$

In the example, a prior distribution may be a 9-component mixture of normal distributions, according to Equation 9:

$$\Pi(\beta) = \sum_{i=1}^{9} \frac{1}{9} N[\mu_{\beta_i}, \Sigma_{\beta_i}] \quad \text{Equation 9}$$

where $$\Sigma_{\beta_i} = \begin{bmatrix} 0.09 & 0 \\ 0 & 0.09 \end{bmatrix} \forall i,$$

and $$\mu_{\beta_1} = [10 \quad 10]' \quad \mu_{\beta_2} = [10 \quad 0]' \quad \mu_{\beta_3} = [10 \quad -10]'$$
$$\mu_{\beta_4} = [0 \quad 10]' \quad \mu_{\beta_5} = [0 \quad 0]' \quad \mu_{\beta_6} = [0 \quad -10]'$$
$$\mu_{\beta_7} = [-10 \quad 10]' \quad \mu_{\beta_8} = [-10 \quad 0]' \quad \mu_{\beta_9} = [-10 \quad -10]'.$$

In the example, a corresponding posterior distribution may be a 9-component mixture of normal distributions, as set forth in Equation 10:

$$\Pi(\beta | y) = \sum_{i=1}^{D} w_i N[M_{\beta_i}, S_{\beta_i}] \quad \text{Equation 10}$$

with $$M_{\beta_i} = \left( \Sigma_{\beta_i}^{-1} + \frac{X'X}{15^2} \right)^{-1} \left( \Sigma_{\beta_i}^{-1} + \frac{X'y}{15^2} \right),$$

$$S_{\beta_i} = \left( \Sigma_{\beta_i}^{-1} + \frac{X'X}{15^2} \right)^{-1} \text{ and}$$

$$w_i = \frac{1}{9\sqrt{2\pi 15^2}} \frac{\sqrt{|S_{\beta_i}|}}{\sqrt{|\Sigma_{\beta_i}|}}$$

$$\exp\left[ -\frac{1}{2} \left( \frac{y'y}{15^2} + \mu'_{\beta_i} \Sigma_{\beta_i}^{-1} \mu_{\beta_i} - M'_{\beta_i} S_{\beta_i}^{-1} M_{\beta_i} \right) \right]$$

In the example, using the information derived from the above equation, it may be possible to evaluate an average bias over replica for j=1, 2 . . . 100. In addition, y and X may be sampled according to methods described herein. Given the analytical form of the posterior distribution, the percentiles (p1, p5, p10, p25, p50, p75, p90, p95, p99) may be evaluated for the mean and standard deviation. Of course, other percentiles, or more or less percentiles may be evaluated in other embodiments.

In the example, a number of chains, 190 in this case, may be sampled from the posterior distribution, as set forth above, with randomly assigned initial values. In an embodiment, the randomly assigned initial values may be generated from a multivariate normal distribution centered at the maximum likelihood estimate for the problem. It can be appreciated that initial values may be randomly assigned, but also may be manually assigned by a user, or determined by a processing unit based upon one or more criteria. Next, the chains may be checked for global or local stationarity. Once two or more chains have been determined to be globally or locally stationary, in an embodiment, the chains may be combined using a simple aggregation of the chains. Once combined, the percentiles (p1, p5, p10, p25, p50, p75, p90, p95, p99) mean and standard deviation may be determined.

In addition to simple aggregation, the example may combine the chains with sorted weighted aggregation with resampling, as discussed herein. Once combined, the percentiles (p1, p5, p10, p25, p50, p75, p90, p95, p99) mean and standard deviation may be determined.

Upon comparison of the average bias of simple aggregation and sorted weighted aggregation with resampling for the percentiles (p1, p5, p10, p25, p50, p75, p90, p95, p99) mean and standard deviation, it appears based upon FIGS. 5-8 that sorted weighted aggregation with resampling performs almost uniformly better than the simple aggregation in this example.

As illustrated in FIG. 5, a table provides a bias comparison for the simple aggregation and the sorted weighted aggregation with resampling methods when the posterior distribution is characterized by multiple modes. In some embodiments, the improvement may be because the posterior with multiple modes does not allow the MCMC scheme to appropriately explore the entire posterior supports. The presence of local regions can trap the algorithm, and without appropriate aggregation, the corresponding aggregated posterior distribution can be strongly biased.

Figure 6:
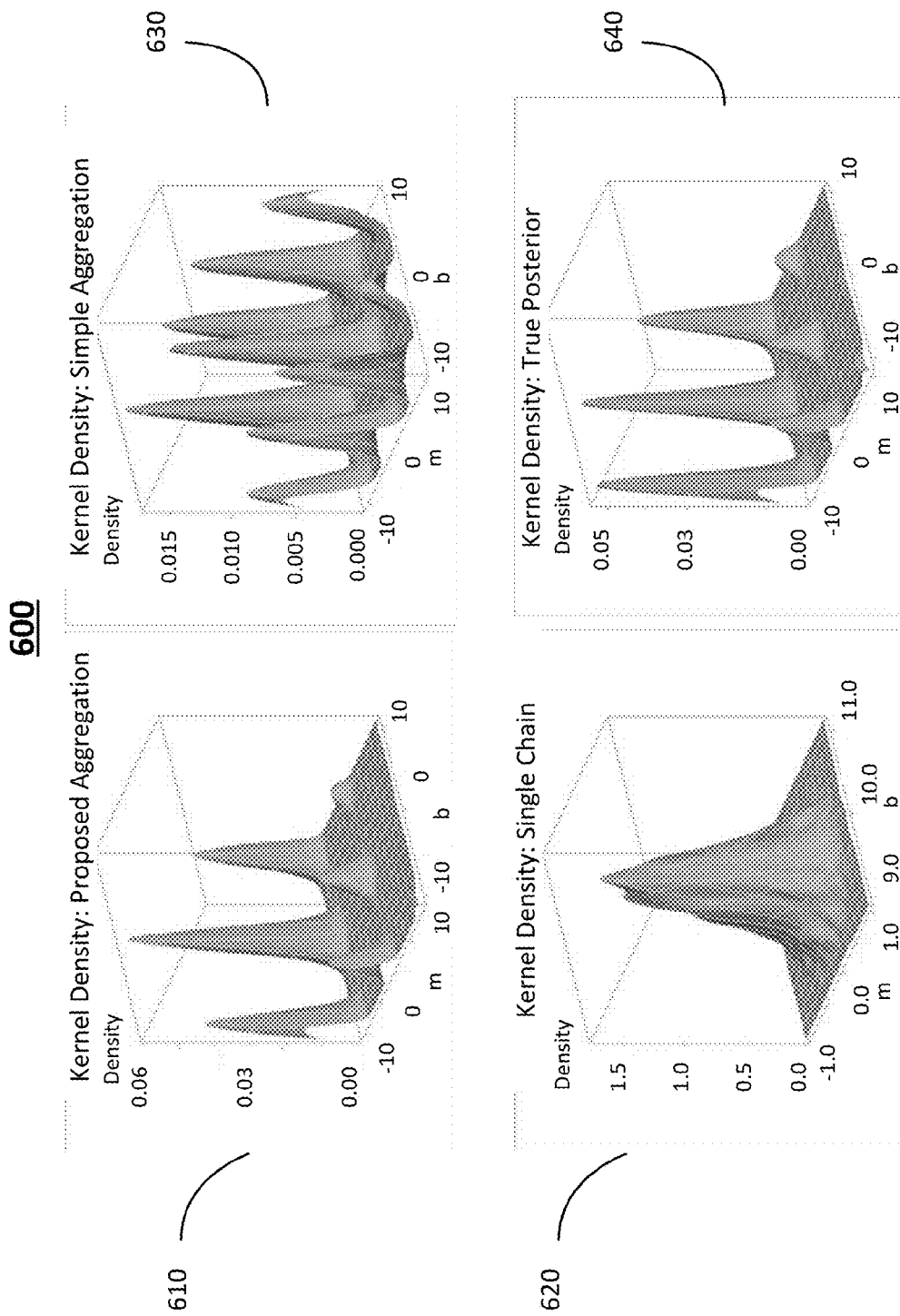
FIG. 6 illustrates an example of a graph representing results of an exemplary embodiment.
Figure 7:
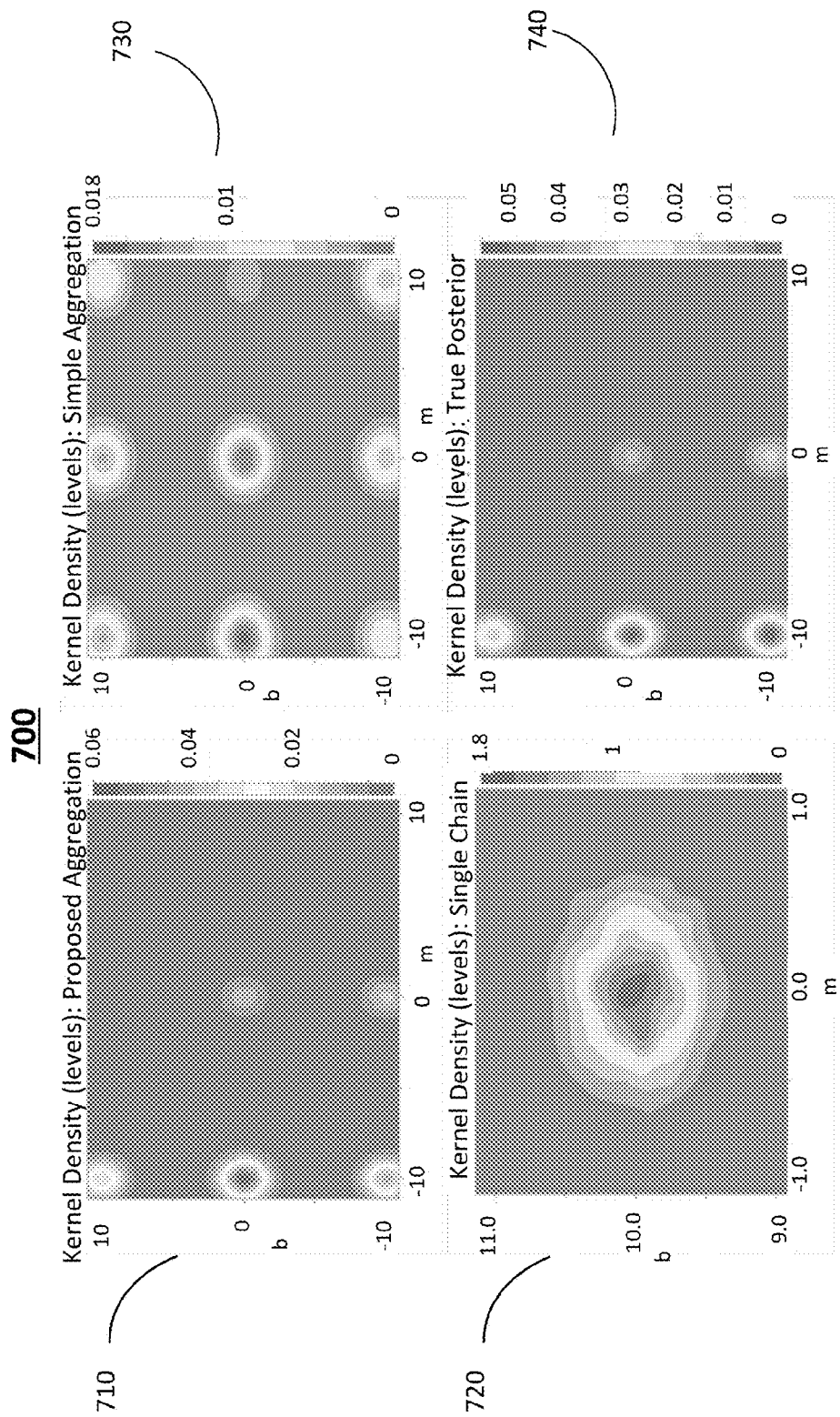
FIG. 7 illustrates an example of a graph representing results of an exemplary embodiment.

FIGS. 6 and 7 illustrate examples of graphs, which further illustrate the comparison of simple aggregation and sorted weighted aggregation with resampling methods, as described herein. The graphs illustrated in FIGS. 6 and 7 show kernel density estimates of the posterior distributions obtained with both aggregation methods as well as the true posterior distribution based above the example given above. As illustrated, the proposed aggregation methods using sorted weighted aggregation with resampling provide a result that is very close to the true posterior, whereas simple aggregation provides a less accurate representation.

FIG. 8 illustrates an example of a table. The table of FIG. 8 represents a bias comparison for simple aggregation and the sorted weighted aggregation with resampling when the posterior distribution is characterized by a unique mode. For example, the MCMC example above may be repeated with a normal mixture prior distribution with identical components, as shown in Equation 11, below.

$$\mu_{\beta_1}=[0,0]' \quad \mu_{\beta_2}=[0,0]' \quad \mu_{\beta_3}=[0,0]'$$

$$\mu_{\beta_4}=[0,0]' \quad \mu_{\beta_5}=[0,0]' \quad \mu_{\beta_6}=[0,0]'$$

$$\mu_{\beta_7}=[0,0]' \quad \mu_{\beta_8}=[0,0]' \quad \mu_{\beta_9}=[0,0]' \quad \text{Equation 11}$$

As illustrated in FIG. 8, the two aggregation methods perform similarly well. Thus, in some embodiments, the sorted weighted aggregation with resampling methods described herein may be set as the default aggregation procedure because it may perform well in both uni-modal and multi-modal distributions.

Figure 9:
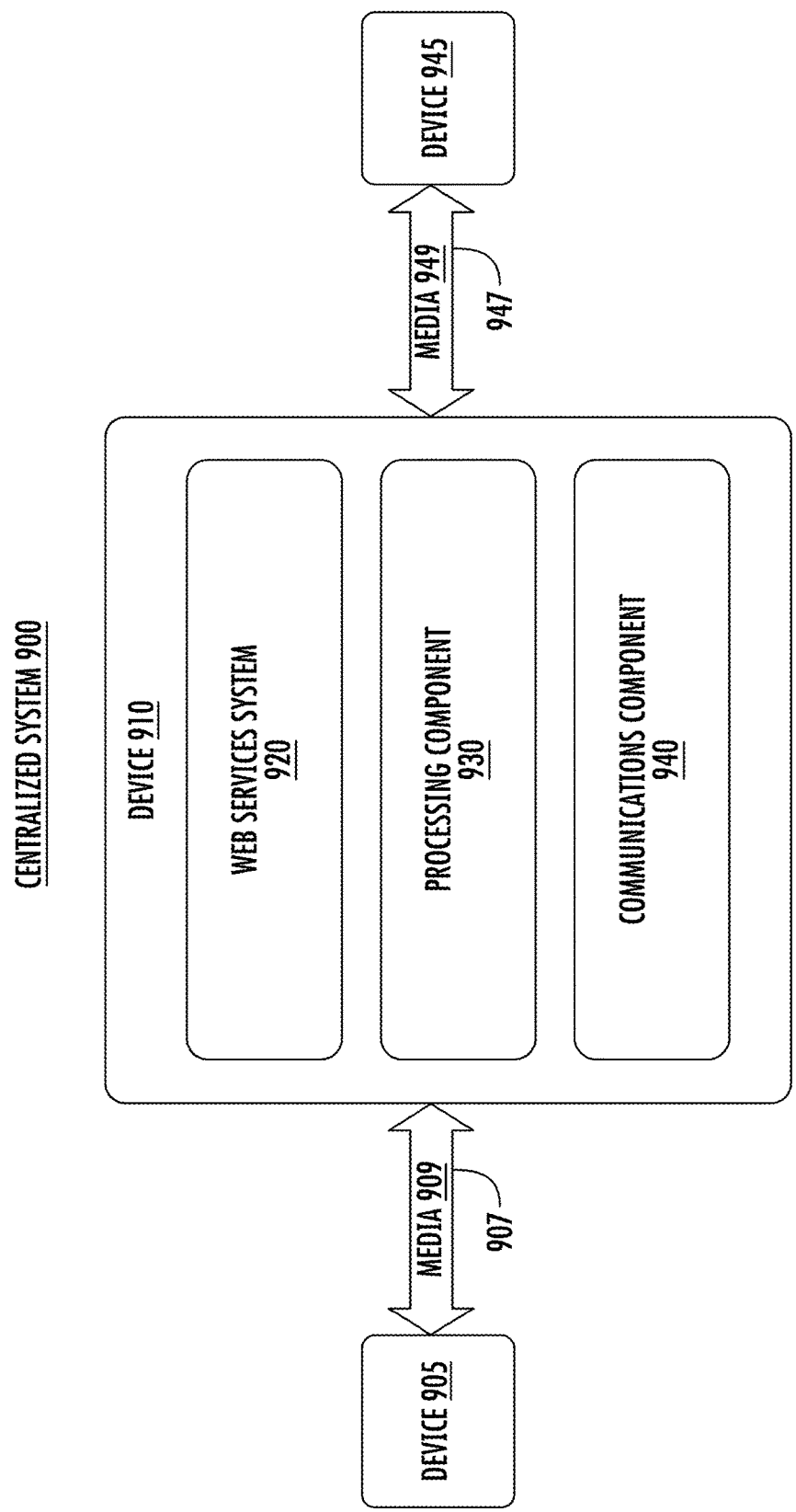
FIG. 9 illustrates an example of a centralized system.

FIG. 9 illustrates an example of a centralized system 900. The centralized system 900 may implement some or all of the structure and/or operations for the disclosed embodiments in a single computing entity, such as entirely within a single device 920.

The device 920 may comprise any electronic device capable of receiving, processing, and sending information for the disclosed embodiments. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the disclosed embodiments using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the disclosed embodiments using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards, backplanes, switch fabrics, semiconductor material, twisted-pair wire, co-axial cable, fiber optics, a propagated communications, and so forth. Examples of wireless communications media may include acoustic, radio-frequency (RF) spectrum, infrared and other wireless media.

The device 920 may communicate with other devices 910, 950 over a communications media 912, 942, respectively, using communications transmissions 914, 944, respectively, via the communications component 940. The devices 910, 950 may be internal or external to the device 920 as desired for a given implementation.

Figure 10:
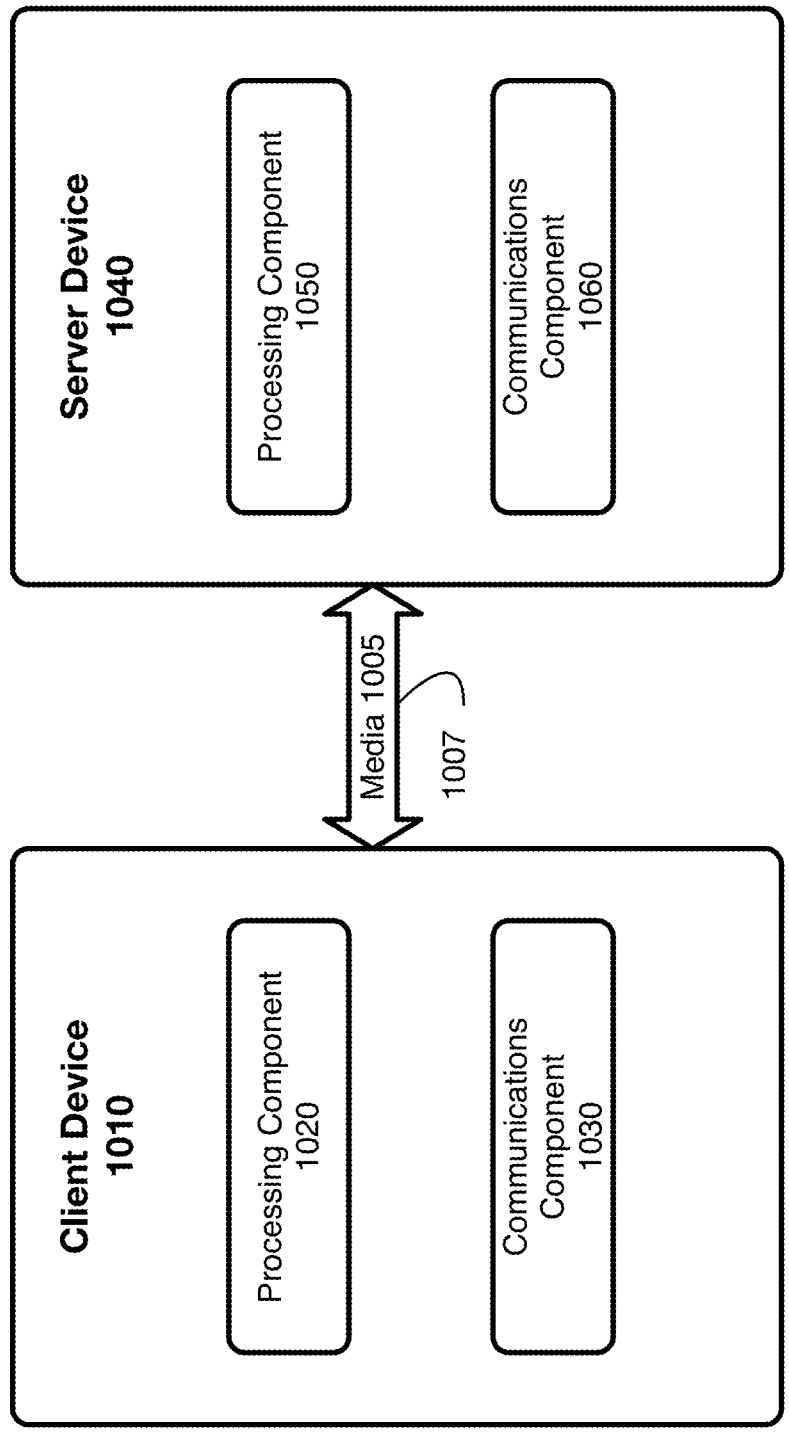
FIG. 10 illustrates an example of a distributed system.

FIG. 10 illustrates an example of a distributed system 1000. The distributed system 1000 may distribute portions of the structure and/or operations for the disclosed embodiments across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1050. In general, the client device 1010 and the server device 1050 may be the same or similar to the client device 920 as described with reference to FIG. 9. For instance, the client system 1010 and the server system 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications transmissions 1014 via the communications components 1040.

The client device 1010 may comprise or employ one or more client programs that operate to perform various methodologies in accordance with the described embodiments. In one embodiment, for example, the client device 1010 may implement some steps described with respect to FIGS. 2 and 3.

The server device 1050 may comprise or employ one or more server programs that operate to perform various methodologies in accordance with the described embodiments. In one embodiment, for example, the server device 1050 may implement some steps described with respect to FIGS. 2 and 3.

Figure 11:
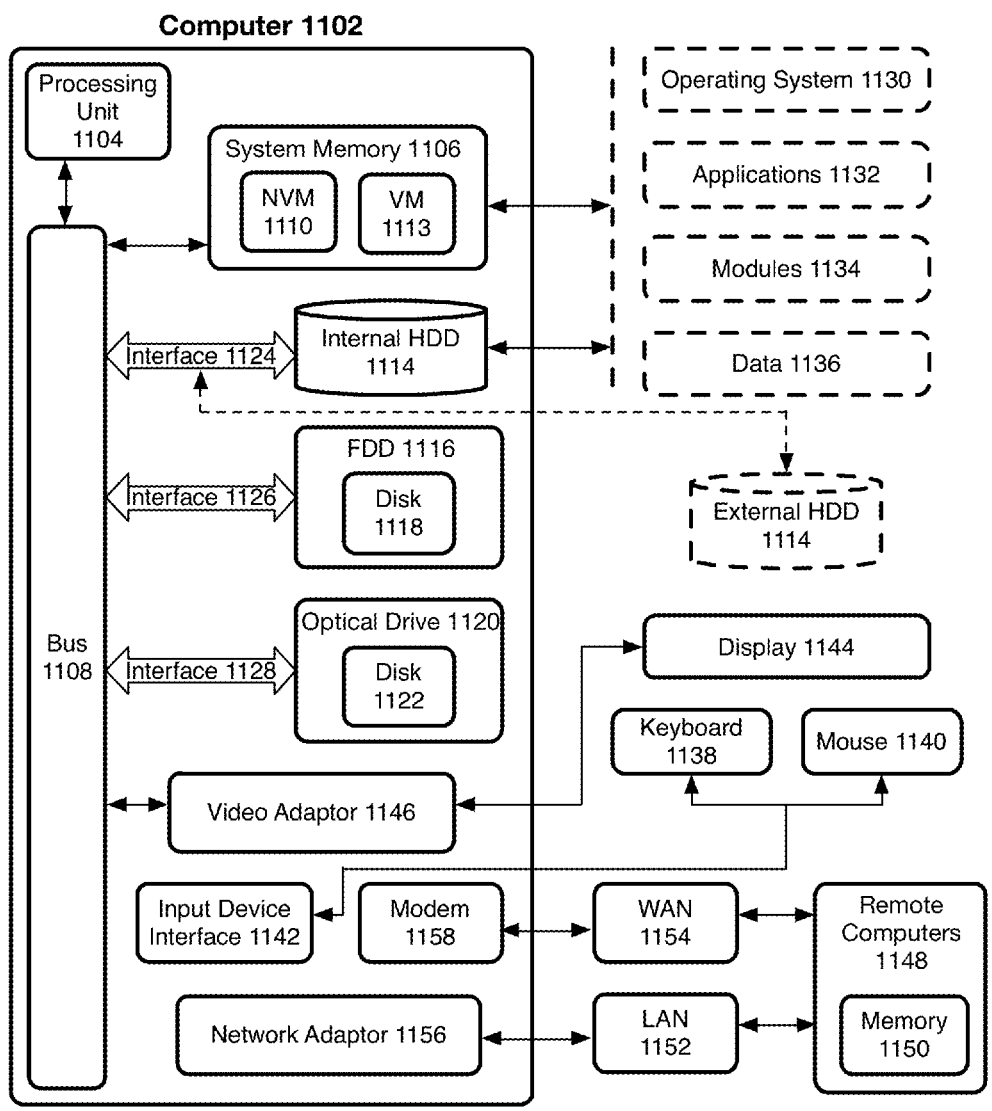
FIG. 11 illustrates an example of a computing architecture.

FIG. 11 illustrates an example of a computing architecture 1100 suitable for implementing various embodiments as previously described. In one embodiment, the computing architecture 1100 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as communications allocated to various communication lines. In such allocations, each message is a communication. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1113. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM, DVD, or Blu-ray). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1113, including an operating system 1130, one or more application programs 1132, other program modules 1134, and program data 1136. In one embodiment, the one or more application programs 1132, other program modules 1134, and program data 1136 can include, for example, the various applications and/or components to implement the disclosed embodiments.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A display 1144 is also connected to the system bus 1108 via an interface, such as a video adaptor 1146. The display 1144 may be internal or external to the computer 802. In addition to the display 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 808 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
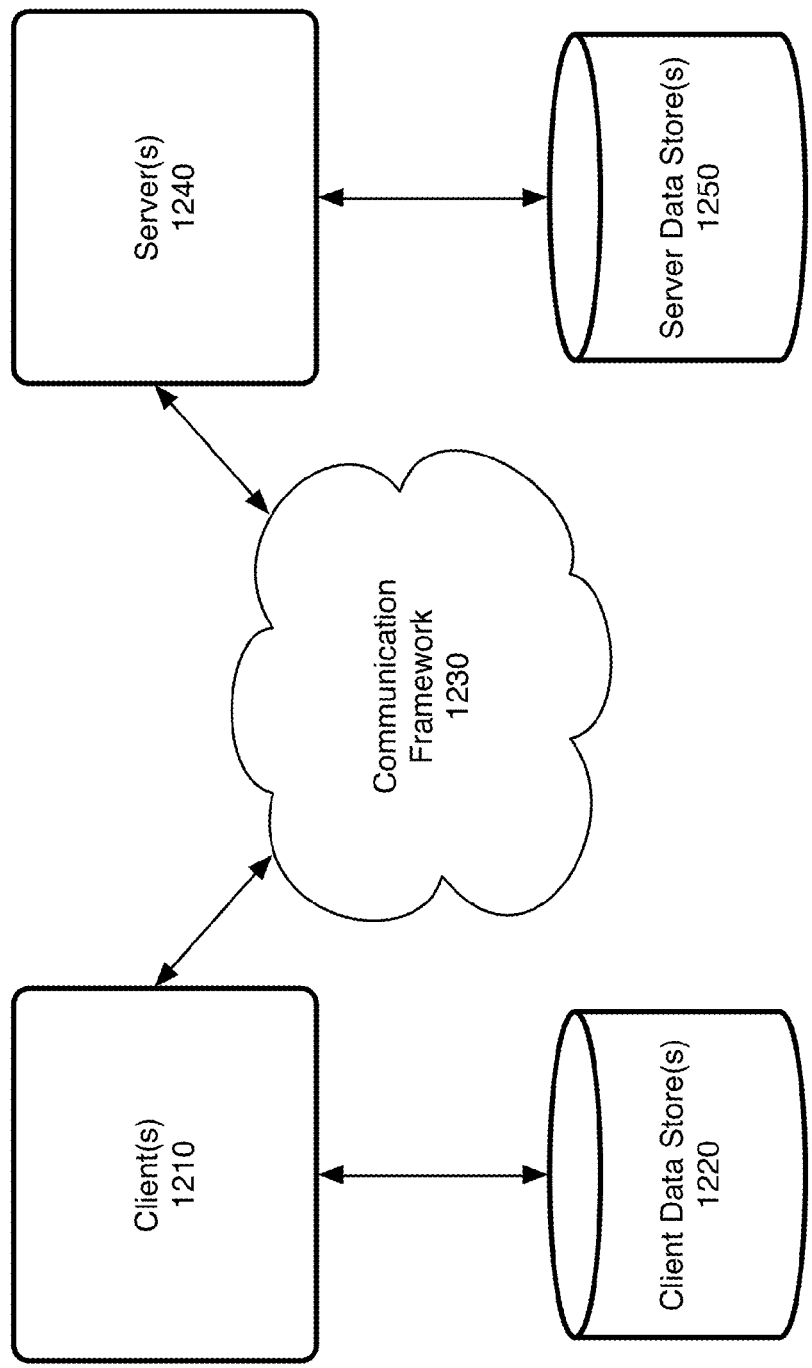
FIG. 12 illustrates an example of a communications architecture.

FIG. 12 illustrates an example of a communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 1010. The servers 1204 may implement the server device 1250. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. An article of manufacture comprising a non-transitory computer-readable storage medium comprising instructions that, when executed, cause a coordinating device of a distributed system to:

coordinate a generation of multiple chains by a plurality of processing nodes of the distributed system from a Bayesian posterior distribution of values, wherein each processing node of the plurality of processing nodes generates one or more chains of the multiple chains independently of and at least partially in parallel with other processing nodes of the plurality of processing nodes;

coordinate a determination by the plurality of processing nodes of whether each chain of the multiple chains has reached stationarity, wherein each processing node of the plurality of processing nodes determines whether each chain of the one or more chains generated by the processing node have reached stationarity independently of and at least partially in parallel with other processing nodes of the plurality of processing nodes;

coordinate a sorting of a subset of the multiple chains that have reached stationarity by the plurality of processing nodes, wherein each processing node of the plurality of processing nodes sorts each chain of the one or more chains generated by the processing node, and that is determined to have reached stationarity, based on a value of an un-normalized probability density associated with a sampled point independently of and at least partially in parallel with other processing nodes of the plurality of processing nodes;

coordinate a resampling with weighting of the subset of the multiple chains by the plurality of processing nodes, wherein each processing node of the plurality of processing nodes assigns weights proportional to the posterior distribution to each chain of the one or more chains generated by the processing node, and that has been sorted by the processing node, during the resampling independently of and at least partially in parallel with other processing nodes of the plurality of processing nodes; and combine, at the coordinating device, the chains of the subset of the multiple chains after the resampling.

2. The article of claim 1, further comprising instructions that, when executed, cause the coordinating device to coordinate utilization of a Markov Chain Monte Carlo (MCMC) algorithm by the plurality of processing nodes to generate the multiple chains from the posterior distribution.

3. The article of claim 1, further comprising instructions that, when executed, cause the coordinating device to generate an approximate sample of a posterior distribution with the combined subset of multiple chains.

4. The article of claim 3, further comprising instructions that, when executed, cause the coordinating device to coordinate a determination, at least partially in parallel, by the plurality of processing nodes of a degree of approximation of the approximate sample of the posterior distribution as a function of a number of samples within each chain of the subset of multiple chains and a number of the chains of the subset of multiple chains.

5. The article of claim 3, further comprising instructions that, when executed, cause the coordinating device to perform a Bayesian analysis on the approximate sample of the posterior distribution.

6. The article of claim 1, further comprising instructions that, when executed, cause the coordinating device to coordinate utilization of multiple processing nodes of the plurality of processing nodes or multiple threads within a single processing node of the plurality of processing nodes to generate a plurality of simulated posterior samples.

7. The article of claim 1, wherein each chain of the multiple chains represents a portion of the Bayesian posterior distribution.

8. The article of claim 1, wherein the determination of whether each chain of the multiple chains has reached stationarity includes a determination of whether each chain of the multiple chains has reached convergence into local regions.

9. The article of claim 1, further comprising instructions that, when executed, cause the coordinating device to coordinate utilization of a Geweke test by the plurality of processing nodes to determine whether the multiple chains have reached stationarity.

10. The article of claim 9, further comprising instructions that, when executed, cause the coordinating device to coordinate utilization of the Geweke test by the plurality of processing nodes to check stationarity by comparing local means.

11. The article of claim 1, further comprising instructions that, when executed, cause the coordinating device to coordinate utilization of a Heidelberger-Welch test by the plurality of processing nodes to determine whether the multiple chains have reached stationarity.

12. The article of claim 11, further comprising instructions that, when executed, cause the coordinating device to coordinate utilization of the Heidelberger-Welch test by the plurality of processing nodes to determine covariance stationarity.

13. The article of claim 1, wherein the subset of the multiple chains are selected from a plurality of regions of the posterior distribution.

14. The article of claim 1, further comprising instructions that, when executed, cause the coordinating device to output the combined chains of the subset of the multiple chains to a storage device.

15. A computer-implemented method, comprising:
coordinating, at a coordinating device of a distributed system, a generation of multiple chains by a plurality of processing nodes of the distributed system from a Bayesian posterior distribution of values, wherein each processing node of the plurality of processing nodes generates one or more chains of the multiple chains independently of and at least partially in parallel with other processing nodes of the plurality of processing nodes;

coordinating, at the coordinating device, a determination by the plurality of processing nodes of whether each chain of the multiple chains has reached stationarity, wherein each processing node of the multiple processing nodes determines whether each chain of the one or more chains generated by the processing node have reached stationarity independently of and at least partially in parallel with other processing nodes of the plurality of processing nodes;

coordinating, at the coordinating device, a sorting of a subset of the multiple chains that have reached stationarity by the plurality of processing nodes, wherein each processing node of the plurality of processing nodes sorts each chain of the one or more chains generated by the processing node, and that is determined to have reached stationarity, based on a value of an un-normalized probability density associated with a sampled point independently of and at least partially in parallel with other processing nodes of the plurality of processing nodes;

coordinating, at the coordinating device, a resampling with weighting of the subset of the multiple chains by the plurality of processing devices, wherein each processing node of the plurality of processing nodes assigns weights proportional to the posterior distribution to each chain of the one or more chains generated by the processing node, and that has been sorted by the processing node, during the resampling independently of and at least partially in parallel with other processing nodes of the plurality of processing nodes; and combining, at the coordinating device, the chains of the subset of the multiple chains after the resampling.

16. The computer-implemented method of claim 15, further comprising coordinating, at the coordinating device, a utilization of a Markov Chain Monte Carlo (MCMC) algorithm by the plurality of processing nodes to generate the multiple chains from the posterior distribution.

17. The computer-implemented method of claim 15, wherein the determination of whether each chain of the multiple chains has reached stationarity includes a determination of whether each chain of the multiple chains has reached convergence into local regions.

18. The computer-implemented method of claim 15, further comprising coordinating, at the coordinating device, a utilization of a Geweke test by the plurality of processing nodes to determine whether the multiple chains have reached stationarity.

19. The computer-implemented method of claim 18, further comprising coordinating, at the coordinating device, a utilization of the Geweke test by the plurality of processing nodes to check stationarity by comparing local means.

20. The computer-implemented method of claim 15, further comprising coordinating, at the coordinating device, a utilization of a Heidelberger-Welch test by the plurality of processing nodes to determine whether the multiple chains have reached stationarity.

21. The computer-implemented method of claim 20, further comprising coordinating, at the coordinating device, a utilization of the Heidelberger-Welch test by the plurality of processing nodes to determine covariance stationarity.

22. The computer-implemented method of claim 15, wherein the multiple chains are generated from a plurality of regions of the posterior distribution.

23. The computer-implemented method of claim 15, further comprising outputting, from the coordinating device, the combined chains of the subset of the multiple chains to a storage device.

24. An apparatus comprising a processor and a storage to store instructions that, when executed by the processor, cause the processor to perform operations comprising:
coordinate, at a coordinating device of a distributed system, a generation of multiple chains by a plurality of processing nodes of the distributed system from a Bayesian posterior distribution of values, wherein each processing node of the plurality of processing nodes generates one or more chains of the multiple chains independently of and at least partially in parallel with other processing nodes of the plurality of processing nodes;
coordinate, at the coordinating device, a determination by the plurality of processing nodes of whether each chain of the multiple chains has reached stationarity, wherein each processing node of the plurality of processing nodes determines whether each chain of the one or more chains generated by the processing node have reached stationarity independently of and at least partially in parallel with other processing nodes of the plurality of processing nodes;
coordinate, at the coordinating device, a sorting of a subset of the multiple chains that have reached stationarity by the plurality of processing nodes, wherein each processing node of the plurality of processing nodes sorts each chain of the one or more chains generated by the processing node, and that is determined to have reached stationarity, based on a value of an un-normalized probability density associated with a sampled point independently of and at least partially in parallel with other processing nodes of the plurality of processing nodes;
coordinate, at the coordinating device, a resampling with weighting of the subset of the multiple chains by the plurality of processing nodes, wherein each processing node of the plurality of processing nodes assigns weights proportional to the posterior distribution to each chain of the one or more chains generated by the processing node, and that has been sorted by the processing node, during the resampling independently of and at least partially in parallel with other processing nodes of the plurality of processing nodes; and
combine, at the coordinating device, the chains of the subset of the multiple chains after the resampling.

25. The apparatus of claim 24, wherein the processor is caused to coordinate, at the coordinating device, utilization of a Markov Chain Monte Carlo (MCMC) algorithm by the plurality of processing nodes to generate the multiple chains from the posterior distribution.

26. The apparatus of claim 24, wherein the determination of whether each chain of the multiple chains has reached stationarity includes a determination of whether each chain of the multiple chains has reached convergence into local regions.

27. The apparatus of claim 24, wherein the processor is caused to coordinate, at the coordinating device, utilization of a Geweke test by the plurality of processing nodes to determine whether the multiple chains have reached stationarity.

28. The apparatus of claim 27, wherein the processor is caused to coordinate, at the coordinating device, utilization of the Geweke test by the plurality of processing nodes to check stationarity by comparing local means.

29. The apparatus of claim 24, wherein the processor is caused to coordinate, at the coordinating device, utilization of a Heidelberger-Welch test by the plurality of processing nodes to determine whether the multiple chains have reached stationarity.

30. The apparatus of claim 29, wherein the processor is caused to coordinate, at the coordinating device, utilization of the Heidelberger-Welch test by the plurality of processing nodes to determine covariance stationarity.

31. The apparatus of claim 24, wherein the multiple chains are generated from a plurality of regions of the posterior distribution.

32. The apparatus of claim 24, the processor is caused to output, from the coordinating device, the combined chains of the subset of the multiple chains to a storage device.

* * * * *